Dec. 27, 1960  M. J. DE ANGELIS  2,966,290
AUTOMOBILE LITTER DEVICE
Filed Nov. 28, 1958  2 Sheets-Sheet 1

INVENTOR.
MICHAEL J. DE ANGELIS
BY
Attorney

Dec. 27, 1960   M. J. DE ANGELIS   2,966,290
AUTOMOBILE LITTER DEVICE

Filed Nov. 28, 1958   2 Sheets-Sheet 2

INVENTOR.
MICHAEL J. DE ANGELIS
BY
Attorney

United States Patent Office 2,966,290
Patented Dec. 27, 1960

2,966,290

AUTOMOBILE LITTER DEVICE

Michael J. De Angelis, 17 Vick Park B, Rochester 7, N.Y.

Filed Nov. 28, 1958, Ser. No. 776,876

2 Claims. (Cl. 224—29)

This invention relates to a litter receiving device, and more particularly to a litter receiving device adapted to be used in an automobile.

In many instances, it is necessary when driving in an automobile to be able to dispose not only of dry litter, such as waste paper, but also refuse which is wet, such as banana peels, the remains of a lunch, or even a partially empty cup of coffee.

Heretofore, various types of litter bags have been manufactured for use in automobiles which are adapted to be attached by hooks, or otherwise mechanically fastened to various portions of the interior of the automobile, such as a side panel, one of the doors, the firewall, or even on the back seat. These prior devices were so constructed that they were unable to contain any quantity of litter without hindering the comfort of the passengers or the driver. Moreover, these prior devices were so constituted that the liquid from any container dropped into the device would be likely to spill into the interior of the automobile if the device were inadvertently knocked or hit by a passenger. Furthermore, the device being open at the top would permit the escape into the car of any odor created by such litter. For these reasons, these devices have proved unsatisfactory.

One of the objects of this invention is to provide an improved litter receiving device adapted to be used in automobiles.

Another object of this invention is to provide an improved litter receiving device which is adapted to be securely fastened in an automobile without using hooks or other mechanical fastening means which are attached to the automobile.

Another object of this invention is to provide an improved litter receiving device of the character described which is normally sealed at its top.

A further object of this invention is to provide an improved litter receiving device which is able to be securely positioned between the dashboard and the propeller shaft housing of the automobile without external fastening means.

A further object of this invention is to provide an improved litter receiving device which is removably secured in position, and has a detachable bag which is able to hold a large quantity of litter without interfering with the driver or the passengers.

A still further object of this invention is to provide an improved litter receiving device adapted to fit all makes and models of automobiles, which will hold liquids as well as solids, and which is so constructed that it will not upset when positioned in the automobile, and is resiliently closed to trap any offensive odors which might emanate from the litter contained therein.

A still further object of this invention is to provide an improved litter receiving device which is easily placed in operative position, easily removed for emptying, and which is inexpensive to manufacture, and durably constructed.

Other objects of this invention will become apparent from the specification, the drawings, and the appended claims.

Referring in detail to the drawings, 10 denotes a telescopic standard which is secured by spring tension between the underside of a dashboard 11 and the transmission housing of the automobile substantially midway between the sides of the automobile, and 12 denotes a litter bag removably mounted thereon.

Figure 4:
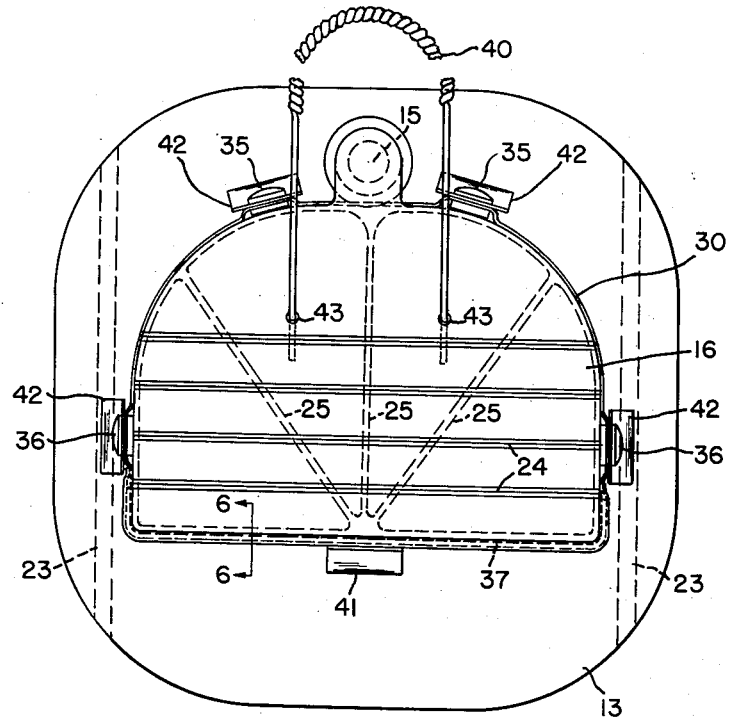
Fig. 4 is a plan view of the litter receiving device, showing additional means attached thereto for securing the device beneath the dashboard.
Figure 6:
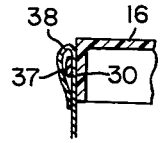
Fig 6 is an enlarged fragmentary cross sectional view taken at line 6—6 of Fig. 4.
Figure 5:
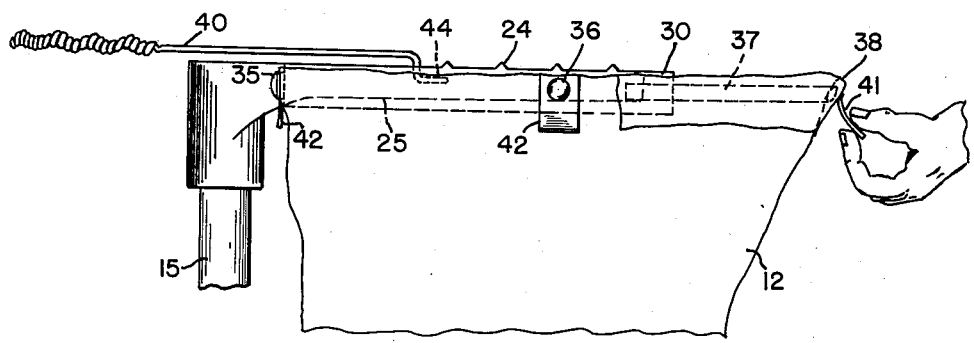
Fig. 5 is a fragmentary side elevation of the litter receiving device showing the bag in an open litter receiving position.

The standard 10, which is preferably made of a light weight material such as plastic, fiberglass, or even aluminum, comprises a base portion 13, to which is attached an elongated hollow tube 14 which is open at one end, and extends normal to the plane of the base member 13. An elongated rod 15, one end of which is inserted in the hollow tube 14, has attached at its other end an upper supporting member or cover 16 (Fig. 4) which extends normal to the axis of the rod 15 substantially parallel to the base member 13. The tube 14 and the rod 15 together constitute the telescopic standard.

The cover 16 and the base 13 are urged apart to clamp between the dashboard and the propeller shaft housing of the automobile by a coil spring 17 which is contained in the hollow tube 14 beneath the rod 15. A radially extending pin 21, which is attached to the rod 15, fits in a vertical slot 22 in the tube 14, and prevents the rod 15 from being forced out of the tube 14 by the spring 17. The pin 21 also prevents relative rotation of the tube 14 and the rod 15, so that the cover 16 and the base 13 are aligned directly one above the other.

The base member 13 is provided on its underside with a pair of parallel spaced ridges 23 which straddle the propeller shaft housing to prevent the standard from slipping sideways when in position. The supporting member or cover 16 is provided with a plurality of toothlike ridges 24 on its upper face which engage under the dashboard of the car to assist in maintaining the standard 10 in the proper position beneath the dashboard 11 and to prevent its sliding relative thereto. The cover 16 has integrally formed ribs 25 on its underside (Fig. 4) to provide added strength to the member 16 so that it may be made more inexpensively and of lighter weight material.

The bag 12, which is open at its upper end, is preferably made of a flexible plastic material such as polyethylene. The big 12 is removably attached at its bottom or lower end by a pair of snap fasteners 32, one member of each pair being secured to the outside of the bag, and the other member of each pair being secured to a horizontal bar 33 fastened to the column 10 just above the base 13. The open end of the bag 12 is adapted to be secured around the peripheral flange 30 of the cover 16. Snaps 35 removably attach the open end of the bag to the back of the flange 30 and snaps 36 removably attach the open end of the bag to each side of the flange 30. The front portion of the open end of the bag is resiliently drawn tight against the front portion of the peripheral edge of the cover 16 by an elastic band 37, which is fastened around the top of the bag in a seam 38. This elastic band holds the upper end of the bag tight around the peripheral edge of the cover 16 so that its contents cannot fall out of the bag and odor cannot permeate the car.

The bag 12 is opened to deposit litter by pulling the top of the bag 12 away from the cover 16 against the tension of the elastic band 37. Tab 41 may be fastened to the bag to provide a means for pulling it open. The elastic band 37 closes the bag when the tab 41 is released. The tabs 42 are fastened to the bag beneath the snaps 35 and 36 to make it easier to unfasten the bag from the cover 16.

A U-shaped spring rod 40 (Fig. 4) may be used to assist in maintaining the standard 10 in operative position for certain configurations of the dashboards. This rod has its outer ends 44 bent to fit in openings 43 in the cover 16 so that the spring rod 40 extends laterally from said cover.

Figure 1:
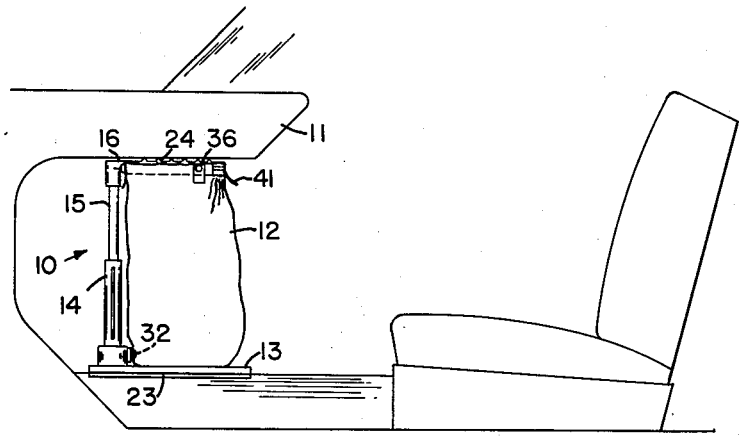
Fig. 1 is a side elevation showing one embodiment of the invention in operative position beneath the dashboard of an automobile.
Figures 2, 3:
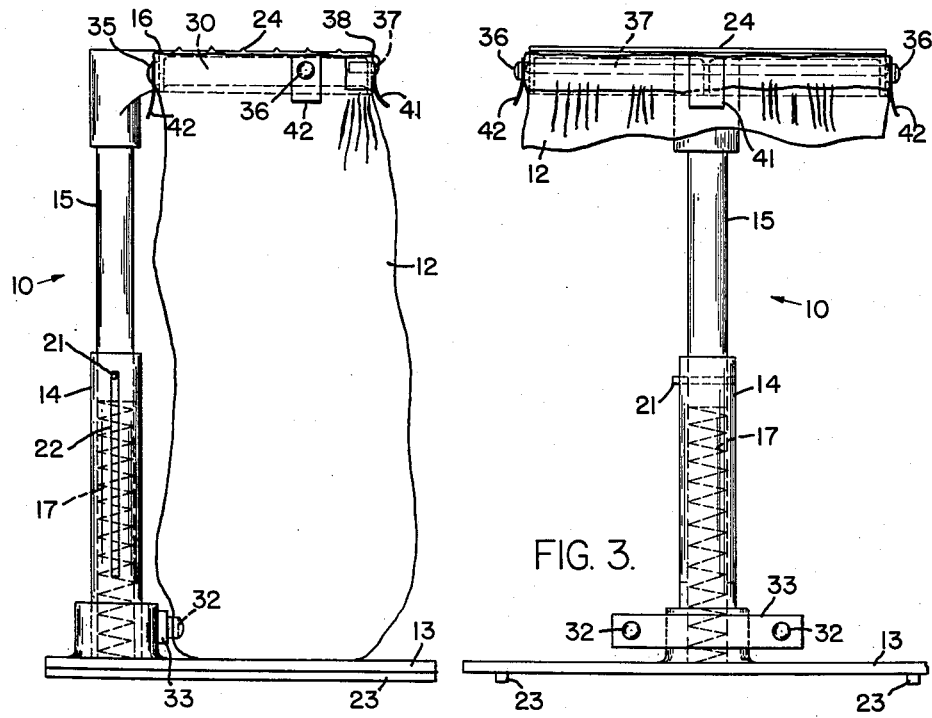
Fig. 2 is a side elevation on an enlarged scale of this embodiment of the invention.
Fig. 3 is a front elevation on the same scale of this embodiment of the invention.

To install the device in an automobile, the standard 10 is inserted in position by manually pushing down on the cover 16 until it slides under the dashboard of the car. The tension of the spring 17 will maintain the standard 10 in the position as shown in Fig. 1. The flexible bag 12 may be attached before inserting the standard 10 in operative position, or can be easily attached to the standard 10 after it is in position by merely placing the opening of the bag around the periphery of the cover 16 and fastening the snaps 32, 35 and 36. As previously described to put litter in the bag, the tab 41 is pulled to free the front of the bag from the periphery of the cover 16. When the bag 12 is full of litter, it may be easily removed and emptied by either detaching the snaps 32, 35 and 36 and leaving the standard 10 in position, or the entire device may be removed for emptying by compressing the cover 16 and the base 13.

The bag 12 may be either transparent or made in a matching color to blend with the interior of the automobile, and may vary in size according to the individual needs of practice.

While the invention has been described in connection with the specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. A litter receiving device for automobiles, comprising a base, a cover, a bag, a pair of telescopic members connecting said base and cover, means resiliently urging said telescopic members apart to hold said base in engagement with the floor of an automobile and said cover in engagement with the undersurface of the dashboard of the automobile, said cover being rigidly secured to the upper of said two telescopic members and having a peripheral flange, means for detachably fastening said bag at spaced points around its top to the flange of said cover to hold said bag in an upright position and with its upper end encompassing the cover flange, said bag having an elastic band secured thereto at its top to hold a portion of the top of said bag between said fastening means resiliently against said flange, and means attached to said bag for manually expanding said bag against the resistance of said elastic band to open said bag.

2. A litter receiving device for automobiles, comprising a base, a cover having a peripheral flange, a bag, a pair of telescopic members connecting said base and cover, spring means resiliently urging said telescopic members apart to hold said base in engagement with the floor of an automobile and to hold the upper surface of said cover in engagement with an undersurface of the dashboard of the automobile, said cover being rigidly secured to the upper of the two telescopic members adjacent its peripheral flange and having serrations on its upper surface for more securely engaging said undersurface of the dashboard, means for detachably fastening said bag at spaced points around its top to the flange of said cover to hold said bag in an upright position and with its upper end encompassing the cover flange, said bag having an elastic band secured thereto at its top to hold a portion of the top of said bag between said fastening means resiliently against said peripheral flange, and a tab attached to said bag between said fastening means for manually expanding said bag away from a portion of said peripheral flange against the resistance of said elastic band for depositing litter in the bag.

References Cited in the file of this patent

UNITED STATES PATENTS

| | | |
|---|---|---|
| 1,322,445 | Hyer | Nov. 18, 1919 |
| 2,084,757 | Alter | June 22, 1937 |
| 2,453,843 | Hanson | Nov. 16, 1948 |
| 2,532,909 | Hart | Dec. 5, 1950 |
| 2,717,110 | Funk | Sept. 6, 1955 |
| 2,760,745 | McCleery | Aug. 28, 1956 |
| 2,798,650 | Durham | July 9, 1957 |